Sept. 29, 1925.

C. D. RYDER

REFLECTOR

Filed May 28, 1924      2 Sheets-Sheet 1

1,555,437

Inventor
Charles D. Ryder.

By

Attorneys

Sept. 29, 1925.

C. D. RYDER

REFLECTOR

Filed May 28, 1924

Inventor
Charles D. Ryder.

By Ward-Ward

Attorneys

Patented Sept. 29, 1925.

1,555,437

UNITED STATES PATENT OFFICE.

CHARLES D. RYDER, OF COVINGTON, KENTUCKY, ASSIGNOR TO THE CINCINNATI VICTOR COMPANY, OF CINCINNATI, OHIO, A CORPORATION OF OHIO.

REFLECTOR.

Application filed May 28, 1924. Serial No. 716,518.

*To all whom it may concern:*

Be it known that I, CHARLES D. RYDER, a citizen of the United States, and residing at Covington, in the county of Kenton and State of Kentucky, have invented a new and useful Improvement in Reflectors, of which the following specification is a full disclosure.

My invention relates to reflectors for lights and is particularly directed to reflectors for automobile headlights. In many States the requisites of the beam cast by an automobile headlight with regard to distribution and intensity of light are specified by law. It is conventional custom to provide an automobile headlight with a plain parabolic reflector and to distort the ensuing beam to the proper pattern and intensity by means of a front lens. I contemplate using a clear glass and generating the light pattern by means of a novel structural contour.

A desirable automobile headlight throws very little light above the horizontal plane of the lamp itself, spreads the light immediately in front of the car to light up the sides of the road and the ditches, and projects a strong beam of light directly ahead to illuminate the road for some distance. It is this general distribution of light which is now called for by most of the State statutes. The pattern projected by each reflector on a vertical plane immediately before the headlight should be somewhat the shape of an isosceles triangle with the base at the bottom. In order to project the beam down the road the greatest concentration of light would be at or about the apex of the triangle.

The object of the invention is to so construct, contour, arrange and coordinate the dominating sufaces of the reflector as to produce a proper relationship between the light diffusing and light concentrating surfaces.

More specifically, the object of my invention is to provide a reflector for a headlight to meet present conditions which will cast a beam of light which will be concentrated directly ahead of the reflector and will be diffused laterally before and below the reflector.

Other objects and advantages will appear from the description of the drawings forming a part of this application, in which.

Figures 1, 2:
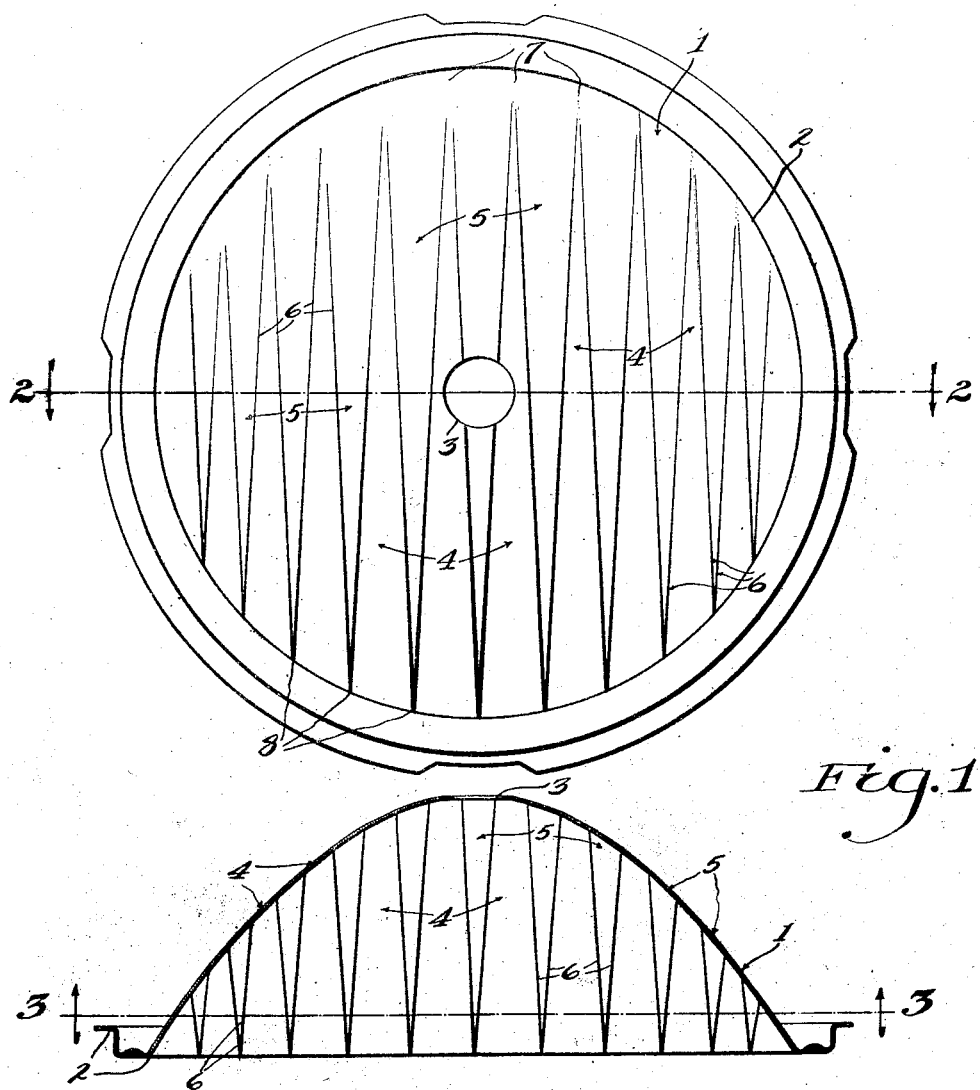
Figure 1 is a face view of the reflector.
Figure 2 is a section taken on line 2—2, of Fig. 1.

Since the reflector is primarily adapted for an automobile headlight, it will be best understood if described with reference to its intended preferred use as mounted in service position on an automobile.

The subject matter comprises a concave reflector 1, preferably shaped to conform to the surface of revolution generated by a curve such as a parabola or hyperbola. If desirable, different portions of the reflector may be generated by different curves. The margin or edge 2 of the reflector is substantially circular. An aperture 3 is provided in the reflector, in this case at the point where it is traversed by the axis of the curve of revolution, through which projects the source of light, customarily an incandescent electric lamp, (not shown). The filament of the electric lamp is usually placed near the axis of revolution at or about the focal point of the generating curve.

If the reflector were a perfect parabola and if the source of light were a point located at a focus thereof, all of the reflected rays would be parallel. But practically the source of light is never a geometric point and moreover a hyperbola or some other curve may be found desirable. Consequently, in practice, reflected rays are not parallel but tend to be slightly divergent. On this account I contemplate placing the headlights on the automobile at a slightly downwardly inclined angle, 2° for instance, so that the rays from the upper portion of the reflector will not be above the horizontal plane of the lamp with reference to the ground, and so that the rays from the lower portion of the reflector will light up the road immediately before the car.

The underlying concept herein disclosed and susceptible of a number of different specific embodiments, involves the utilization of the following principles:

A. Reflecting surfaces can be contoured to either relatively concentrate or diffuse the light emanating from a given source. Therefore that area of the surface of a reflector which is to produce that portion of the pattern where relatively concentrated light is desired should be contoured to produce that sort of light, and that area of the surface which is to produce that portion of the pattern where diffused light is desired, should be contoured to produce that sort of light.

B. If these so-called areas or fields of light diffusing formation and areas of light concentrating formation be opposed, or otherwise rendered effective in relation to the horizontal diameter of the rim, and if the contours be developed in directions extending substantially transversely to said diameter, the reflected light rays will define a selected and corresponding outline and area of illumination, having the pattern effect of mergence from a zone of maximum diffusion into an intensified light spot. It is at present undesirable to have a sharp line of demarcation between the different intensities of light and it is highly desirable to have a pattern in which intensity of the light is constantly varying between the extreme concentration and the extreme diffusion. This gradedly varying intensity of light on the pattern can be produced in two ways:

1. By constructing the reflector so that the light diffusing contouring gradually develops into the light concentrating contouring.

2. By constructing the reflector so that the light concentrating areas and the light diffusing areas gradually merge one into the other.

I have preferred to illustrate for purposes of disclosure an embodiment coordinating both of these methods, though it is to be noted that embodiments of the one or the other of these methods would represent merely the variation or modification in relation to the broader inventive concept.

By the terms "concentrated" and "diffused" light is meant relatively concentrated and relatively diffused light, and the term "concentrated light" is not meant or used as synonymous with "light produced by converging rays". In other words, "concentrated" is not synonymous with "convergent".

Flat or convex surfaces invariably diffuse light, whereas concave surfaces when properly positioned with relation to the source of light tend to concentrate the same. Within certain limits the degree of concentration varies with the degree of curvature. Where too great a degree of curvature is employed at too great a distance from the source of light, cross rays and consequently diffusion result. Therefore it is possible to employ concaved surfaces both to concentrate and to diffuse light. In the disclosed embodiment of the invention, however, the diffusing surfaces are shown as flat surfaces or rather as laterally flattened surfaces, or surfaces abnormal to the curvature of the concave. The surfaces may also be defined as generated by straight line elements parallel to the horizontal median plane and directrix on the concave surface transverse to said plane.

My invention is illustrated in its preferred form by the disclosed series of alternately arranged vertically extending wedge-shaped divisions or zones, 4, 5, formed by the projections 6 of lines, in this case straight lines, onto the surface of revolution. As illustrated, the angle at the apices 7, 8, of these wedge-shaped zones is 6°. This angle may be varied and a great variety of constructions produced. I have shown the apices 7 of these divisions located at or about the margin 2 of the reflector. The position of the apices may be also varied. Those divisions 4 having their apices 7 toward the top of the reflector are horizontally flattened in order to diffuse the light. Those wedge-shaped zones 5 having their apices 8 toward the bottom of the reflector are preferably horizontally flattened toward the bottom of the reflector near their apices and develop gradually into surfaces of revolution, i. e., the general contour of the reflector, toward their tops.

Figure 4:
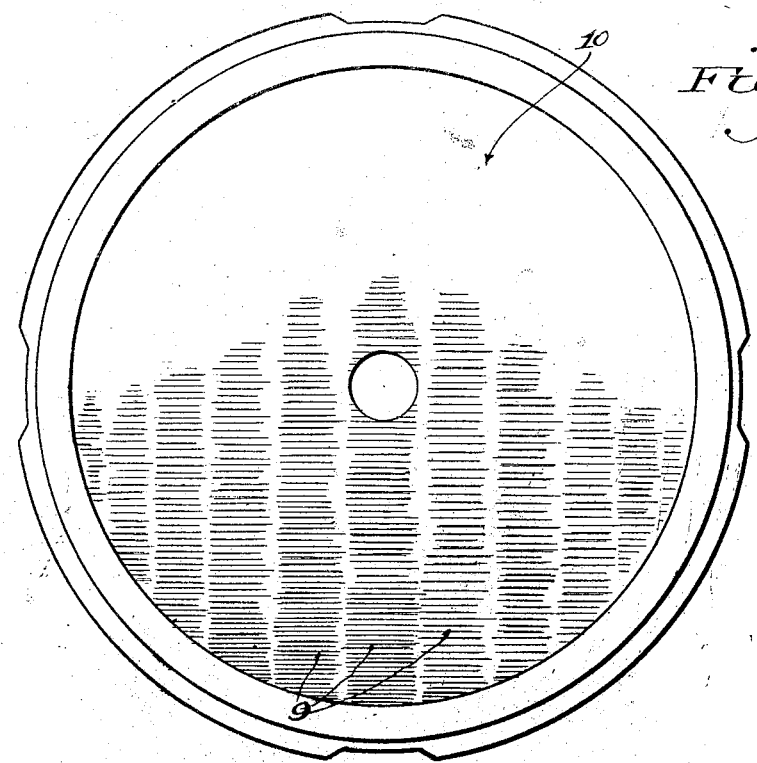
Figure 4 is a diagrammatic view representing light concentrating areas developing into light diffusing areas without lineal definition in the drawing.
Figure 3:
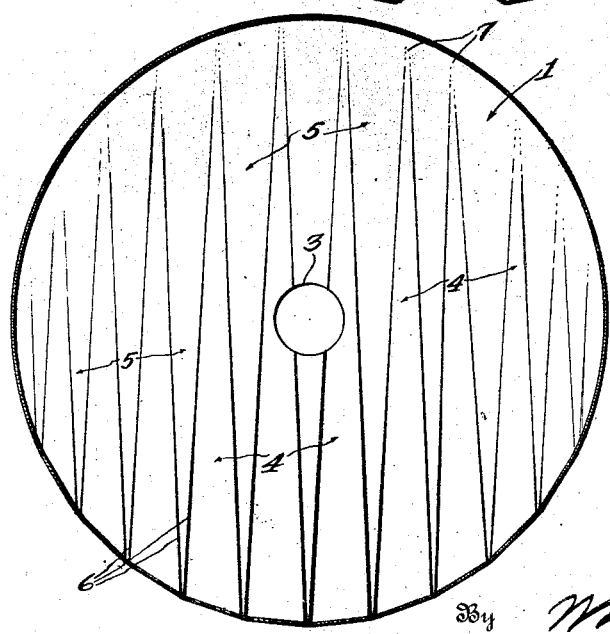
Figure 3 is a section taken on line 3—3 of Fig. 2.

This development is illustrated in Fig. 4 where light diffusing areas 9 are shown, gradually developing into a light concentrating area 10. No definite shapes or lineal boundaries for these areas are indicated. The development is accomplished by gradually decreasing the degree of curvature in the direction of the development. While it is old in the art to provide horizontally flat divisions, the characteristic of panels 5 as herein disclosed, namely, horizontally flat surfaces gradually and vertically developing into horizontally concaved surfaces, or into the surface of revolution, is to the best of my knowledge, substantially novel in this art, and productive of a new and desirable illuminating effect.

It is found preferable that the lines bounding the divisions be substantially coincident with the general surface of revolution, some slight variation being due to the disturbing of the general surface.

Thus adjacent to the upper edge of the reflector the surfaces of revolution predominate, whereas adjacent to the lower edge the horizontally flat surfaces predominate and between, ratio of surface approximating the surface of revolution to surface approximating horizontally flat surface is constantly vertically varying. The light is diffused downwardly and laterally before the reflector by its lower portion, a concentrated beam of light is projected directly forward by the surfaces of revolution of the upper portion and between, the light intensity varies, thus producing a pattern free from shadows, streaks and spots.

Many panel or zone arrangements may be used to accomplish this general result and I have merely shown alternately wedge-shaped divisions by way of illustration.

It must also be understood that very similar results can be obtained by placing the source of light considerably ahead of the focal point and turning the reflector upside down. The beams from the upper and lower halves will cross one another and produce substantially the same pattern.

Having described my invention, I claim:

1. A reflector for automobile headlights comprising a concave reflecting surface with a substantially circular margin, having vertically extending alternately arranged wedge-shaped divisions with their edges substantially coincident with the surfaces generated by the revolution of a curve about an axis, said divisions varyingly disturbed from the surface of revolution to provide a preponderance of surfaces of revolution adjacent to the upper portion of the margin of the reflector, a preponderance of horizontally flat surfaces adjacent to the lower margin of the reflector and a constantly vertically varying ratio of surface approximating revolution to surface approximating horizontally flat surface in between said upper and said lower portions of the margin of the reflector.

2. A reflector for automobile headlights, comprising a concave reflecting surface having alternately arranged vertically extending wedge-shaped divisions, those divisions having their apices toward the top having horizontally flat surfaces, and those divisions having their apices toward the bottom conforming at their bases to the surface generated by the revolution of a curve about an axis.

3. A reflector having the general shape of a concave focalizing reflector, said reflector formed with horizontal curvature variations adapted to modify the normal distribution of the light, said curvature variations departing more from the general focalizing curvature in one-half of the reflector than in the other half, thus providing dominating light concentrating areas in the one half and dominating light diffusing areas in the other half, said curvature variations changing gradually vertically to merge the different light intensities.

4. A concave reflector for headlights provided with vertically extending zones, the horizontal curvature of which gradually develops from the basic curvature of the concave reflector to substantially straight line contouring which is adapted to spread the light horizontally.

5. A concave reflector for headlights comprising two series of wedge-shaped divisions alternately arranged, the horizontal curvature of the divisions of one series diminishing in the direction of their apices from the basic curvature of the concave reflector to substantially straight line contouring, the horizontal contouring of the divisions of the other series being substantially straight line contouring adapted to spread the light horizontally.

In witness whereof I hereunto subscribe my name.

CHARLES D. RYDER.